United States Patent
Ramirez Ortiz et al.

(10) Patent No.: US 10,359,108 B1
(45) Date of Patent: Jul. 23, 2019

(54) GEAR HOUSING INCLUDING SNAP-FIT CONNECTION BETWEEN HOUSING COVER AND HOUSING CONTAINER SIDEWALL

(71) Applicants: Robert Bosch Mexico Sistemas Automotrices S.A. de C.V., Toluca (MX); Robert Bosch GmbH, Stuttgart (DE)

(72) Inventors: Luis Angel Ramirez Ortiz, Toluca (MX); Alex Martin, Karlsruhe (DE); Pablo Daniel Molina Cardozo, Toluca (MX)

(73) Assignees: Robert Bosch Mexico Sistemas Automotrices S.A. DE C.V., Toluca (MX); Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/030,357

(22) Filed: Jul. 9, 2018

(51) Int. Cl.
| | | |
|---|---|---|
| *F16H 57/02* | (2012.01) | |
| *F16B 2/20* | (2006.01) | |
| *F16H 57/031* | (2012.01) | |
| *F16B 2/22* | (2006.01) | |

(52) U.S. Cl.
CPC ............ *F16H 57/031* (2013.01); *F16B 2/22* (2013.01)

(58) Field of Classification Search
CPC ....... F16H 57/031; F16H 57/039; H02K 5/04; F16B 2/22; Y10T 24/303; Y10T 403/599; Y10T 403/606
See application file for complete search history.

(56) References Cited

U.S. PATENT DOCUMENTS

| | | | | |
|---|---|---|---|---|
| 5,551,589 A | * | 9/1996 | Nakamura | E05C 19/066 220/326 |
| 5,577,779 A | * | 11/1996 | Dangel | E05C 19/06 220/326 |
| 5,699,601 A | * | 12/1997 | Gilliam | B25B 27/00 29/278 |
| 6,163,096 A | | 12/2000 | Michenfelder et al. | |

(Continued)

FOREIGN PATENT DOCUMENTS

| | | | | |
|---|---|---|---|---|
| DE | 102015117442 A1 | * | 4/2016 | ............. F16H 55/06 |
| DE | 102017210019 A1 | * | 12/2017 | ............... H02K 5/04 |

(Continued)

OTHER PUBLICATIONS

Machine translation of JP 2010-45954 A obtained on Nov. 6, 2018.*

*Primary Examiner* — Adam D Rogers
(74) *Attorney, Agent, or Firm* — Kelly McGlashen; Maginot Moore & Beck LLP

(57) ABSTRACT

A housing a housing container, a housing cover configured to close an open end of the housing container and a snap-fit fastener that secures a rim of the housing cover to a sidewall of the housing container. The housing container includes a base and a sidewall that protrudes from the base. The fastener includes an elastic clip that is disposed on an outer surface of the sidewall and a rigid lug that protrudes from the cover and engages the clip. The clip has a U-shaped plate portion that extends in parallel to the sidewall and defines clip opening. The lug includes a ridge that protrudes into the clip opening and engages the plate portion. The plate portion is dimensioned so that an outer edge of the plate portion is disposed no further from the container base than the sidewall free edge.

20 Claims, 8 Drawing Sheets

(56) References Cited

U.S. PATENT DOCUMENTS

| | | | | |
|---|---|---|---|---|
| 7,005,767 | B2 * | 2/2006 | Oh | F16H 57/031 310/89 |
| 8,286,533 | B2 * | 10/2012 | Hurst | B60S 1/166 74/606 R |
| 8,627,745 | B2 * | 1/2014 | Uchimura | F16H 57/023 74/425 |
| D736,265 | S | 8/2015 | Walter et al. | |
| 9,188,214 | B2 * | 11/2015 | Suto | F16H 1/16 |
| 9,365,343 | B2 | 6/2016 | Klemm et al. | |
| 9,821,935 | B2 * | 11/2017 | Fujii | B65D 43/0233 |
| 9,927,003 | B2 * | 3/2018 | Qi | F16H 57/028 |
| 9,969,303 | B2 * | 5/2018 | Ta | F16H 57/12 |
| 2003/0008746 | A1 * | 1/2003 | Meier | H02K 11/215 475/149 |
| 2012/0187812 | A1 * | 7/2012 | Gerst | E05C 19/06 312/237 |
| 2013/0180357 | A1 * | 7/2013 | Valliere | F16H 57/027 74/608 |
| 2016/0169326 | A1 * | 6/2016 | Fujii | F16H 1/08 74/414 |

FOREIGN PATENT DOCUMENTS

| | | | | |
|---|---|---|---|---|
| EP | 2037153 | A2 * | 3/2009 | F16H 57/031 |
| FR | 3036450 | A1 * | 11/2016 | A01D 34/6806 |
| JP | 2010045954 | A * | 2/2010 | |
| JP | 2017194151 | A * | 10/2017 | F16H 57/12 |
| WO | WO-2017217495 | A1 * | 12/2017 | F16H 1/16 |

* cited by examiner

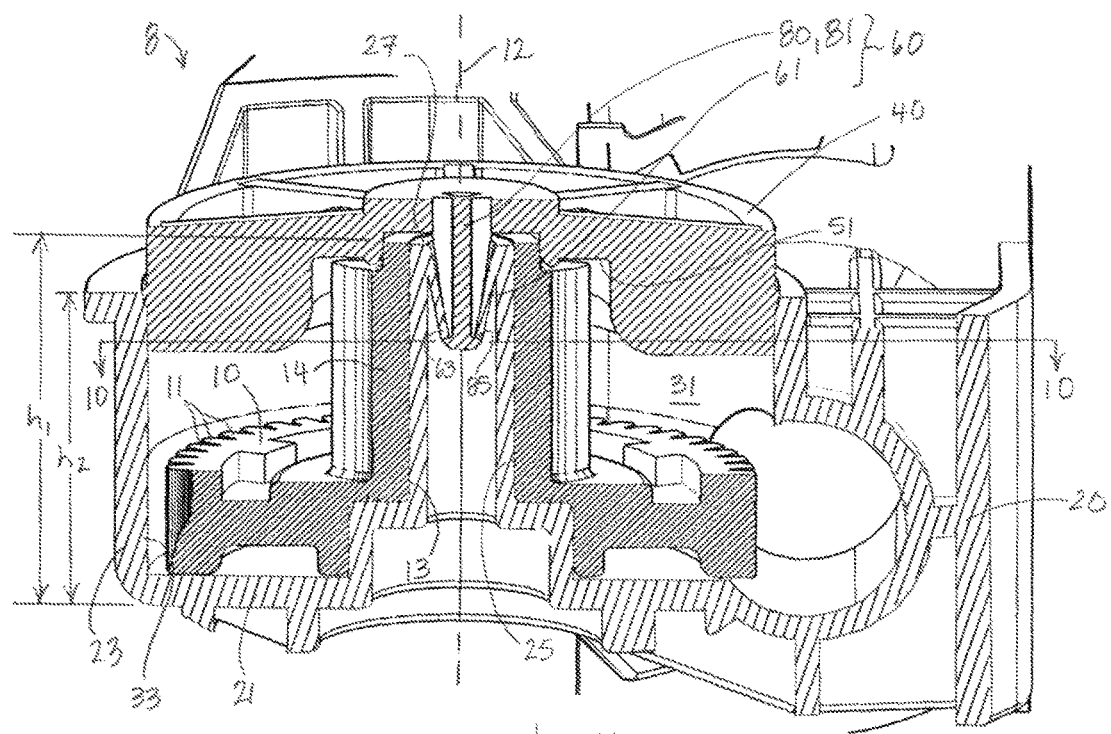
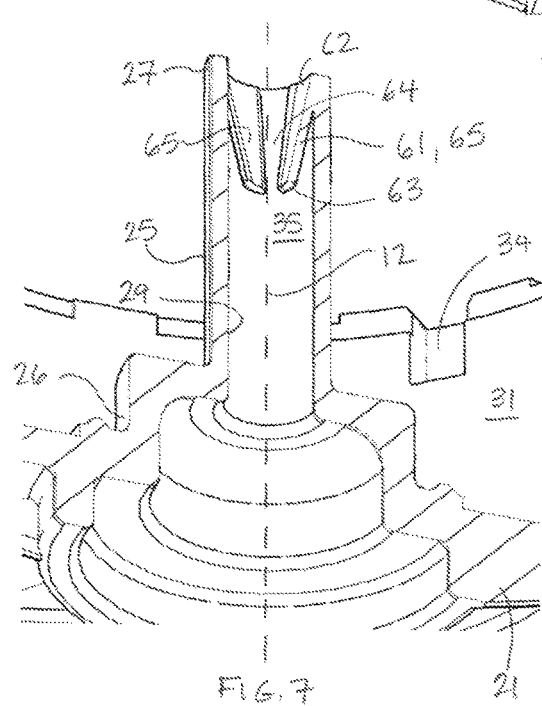

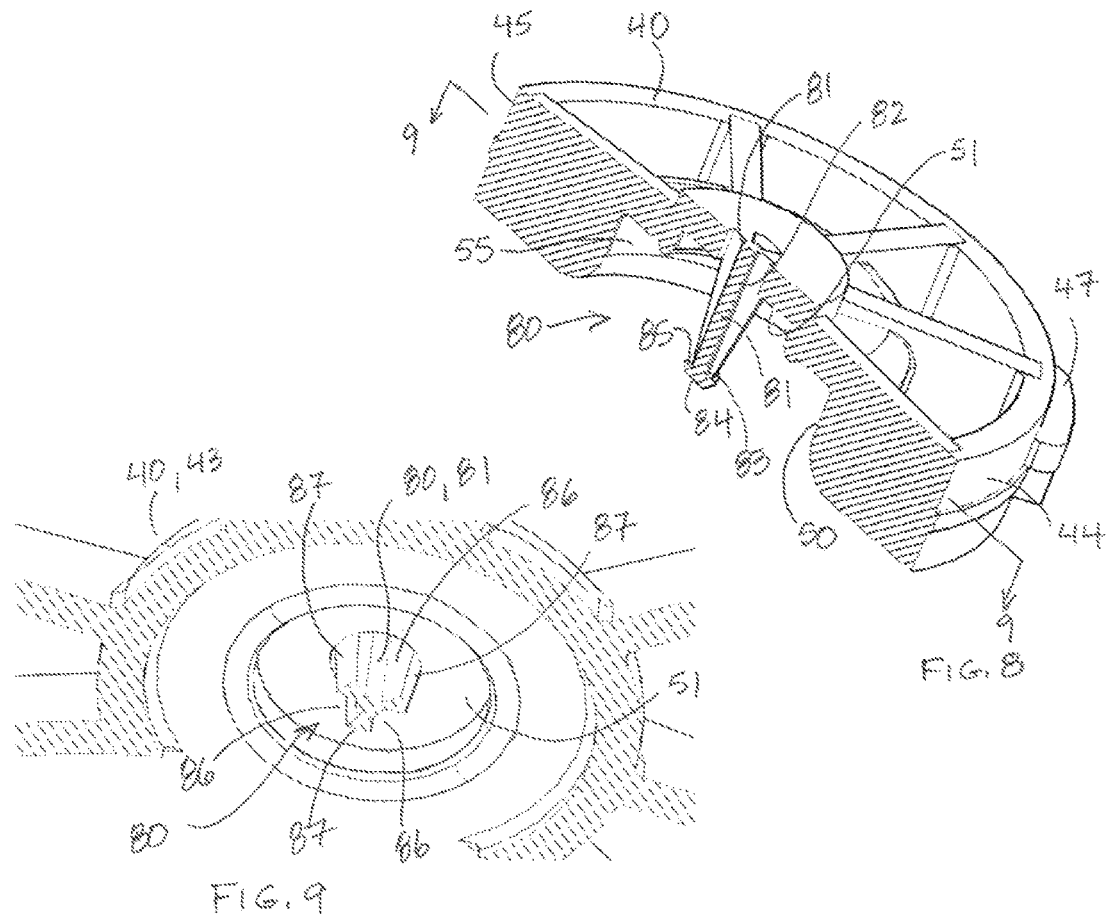
FIG. 8
FIG. 9
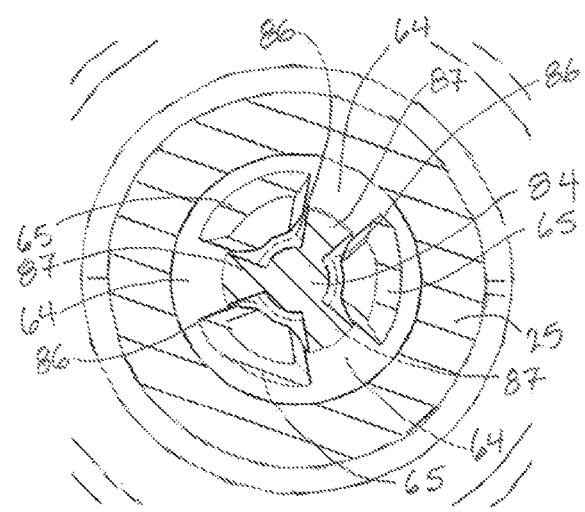
FIG. 10

GEAR HOUSING INCLUDING SNAP-FIT CONNECTION BETWEEN HOUSING COVER AND HOUSING CONTAINER SIDEWALL

BACKGROUND

Actuators such as those used to adjust seat position within a vehicle may include an electric motor and a gear set disposed between the drive motor and seat that transmits the output of the motor to the vehicle seat. The gear set may be disposed in a housing having separable components such as a container and a cover that are assembled together after the gear set has been installed therein. The housing components are maintained in the assembled configuration using mechanical fasteners, adhesives, welding or other fastening techniques. Use of snap-fit mechanical fasteners can be advantageous since the snap fit fastener components may be formed integrally with the corresponding housing components in an injection molding process and since housing assembly is simple and can be performed without tools. However, in some embodiments, the snap fit fastener components may protrude from edge portions of the housing container and cover. During handling of the gear housing components, for example during assembly of the gear set and/or during assembly of the gear housing components, the snap fit fastener components may be loaded and can break, which results in reduced manufacturability.

In some actuators, the gear set includes a worm gear that is driven by a pinion mounted on the motor output shaft. In use, the worm gear may generate forces on the housing in a direction that tends to separate the cover from the container, for example in a direction parallel to the rotational axis of the worm gear. In some embodiments, the generated forces are sufficient to require five or six fasteners between the lid and the container in order for the cover to be retained on the container. The large number of fasteners increases the likelihood of damage during handling, and the effort of measurement during production and quality assurance is more difficult and expensive than for housings having fewer such fasteners. In addition, the worm gear is supported on and rotates about a gear shaft that is spaced apart from the gear housing sidewalls. The distance between the location of force application at the gear shaft and the fasteners at the gear housing sidewalls may result in an undesirable and/or excessive deflection of the cover.

A need exists for an actuator housing that has fasteners that securely join the housing components, are unlikely to be damaged during handling and assembly, and minimize the number of fasteners that are required to maintain the housing components in an assembled configuration without undesirable deflection of the housing components.

SUMMARY

In some aspects, a fastener is configured to connect a housing cover to an open end of a housing container. The housing container includes a base, an axis that extends in a direction perpendicular to the base, and a sidewall that extends about a peripheral edge of the base and protrudes from the base in a direction that is parallel to the axis. The fastener includes a clip that is disposed on an outer surface of the sidewall and a lug that protrudes from the cover and engages the clip. The clip includes a U-shaped plate portion that extends in parallel to the sidewall such that an insertion space is provided between the plate portion and the sidewall. The plate portion includes an axially extending first leg, an axially extending second leg, and a latch bar that extends perpendicularly to the first and second legs. The latch bar has a first end, a second end that is opposed to the first end, an outer edge that extends between the first end and the second end in a direction perpendicular to the axis and an inner edge that is parallel to the outer edge. A proximal end of the first leg is joined to the outer surface of the sidewall and a distal end of the first leg is spaced apart from the outer surface of the sidewall and joined to the first end of the latch bar. Similarly, a proximal end of the second leg is joined to the outer surface of the sidewall and a distal end of the second leg is spaced apart from the outer surface of the sidewall and joined to the second end of the latch bar. The latch bar, the first leg and the second leg define a clip opening. The lug includes a lug plate that protrudes from an outer surface of the cover in a direction perpendicular to the axis, and a ridge that protrudes along one end of the lug plate in a direction perpendicular to the axis. The ridge provides a latch bar engagement edge. When the clip is assembled with the lug, the lug plate extends into the insertion space, the ridge protrudes into the clip opening and the latch bar engagement edge abuts the inner edge of the latch bar, and the plate portion is dimensioned so that the latch bar outer edge is disposed no further from the base than a free edge of the sidewall.

In some aspects, a housing includes a housing container, a housing cover configured to close an open end of the housing container and a mechanical fastener that secures the housing cover to the housing container open end. The housing container includes a base, an axis that extends in a direction perpendicular to the base, and a sidewall that extends about a peripheral edge of the base and protrudes from the base in a direction that is parallel to the axis. The fastener includes a clip that is disposed on an outer surface of the sidewall and a lug that protrudes from the cover and engages the clip. The clip includes a U-shaped plate portion that extends in parallel to the sidewall such that an insertion space is provided between the plate portion and the sidewall. The plate portion includes an axially extending first leg, an axially extending second leg, and a latch bar that extends perpendicularly to the first and second legs. The latch bar has a first end, a second end that is opposed to the first end, an outer edge that extends between the first end and the second end in a direction perpendicular to the axis and an inner edge that is parallel to the outer edge. A proximal end of the first leg is joined to the outer surface of the sidewall and a distal end of the first leg is spaced apart from the outer surface of the sidewall and joined to the first end of the latch bar. Similarly, a proximal end of the second leg is joined to the outer surface of the sidewall and a distal end of the second leg is spaced apart from the outer surface of the sidewall and joined to the second end of the latch bar. The latch bar, the first leg and the second leg define a clip opening. The lug includes a lug plate that protrudes from an outer surface of the cover in a direction perpendicular to the axis, and a ridge that protrudes along one end of the lug plate in a direction perpendicular to the axis. The ridge provides a latch bar engagement edge. When the clip is assembled with the lug, the lug plate extends into the insertion space, the ridge protrudes into the clip opening and the latch bar engagement edge abuts the inner edge of the latch bar, and the plate portion is dimensioned so that the latch bar outer edge is disposed no further from the base than a free edge of the sidewall.

In some embodiments, the clip is sufficiently elastic to be displaced relative to the sidewall in a direction perpendicular to the axis upon application of a perpendicular force to the clip, and to return to an undisplaced configuration upon removal of the perpendicular force.

In some embodiments, the housing cover includes a cover portion and a rim that extends about a peripheral edge of the cover portion and protrudes toward the base in a direction that is parallel to the axis, and the rim includes an extension tab that protrudes from a free edge of the rim in a direction parallel to the axis, and the lug is disposed on the extension tab.

In some embodiments, the lug is arranged on the extension tab such that the ridge is further from the cover portion than the rim free edge.

In some embodiments, a portion of the extension tab extends into the housing container and overlies an inner surface of the sidewall.

In some embodiments, the housing includes a pair of bumpers that protrude from the sidewall outer surface such that a bumper is disposed on each of opposed sides of the plate portion, wherein each bumper protrudes outward from the sidewall at least a distance of an outer surface of the plate portion from the sidewall.

In some embodiments, the bumper has an axial dimension that is at least as long an axial dimension of the plate portion.

In some embodiments, the bumper protrudes irregularly along a surface of the sidewall in a direction parallel to the base such that the distance that the bumper protrudes outward from the sidewall is at a maximum at locations of the bumper nearest to the plate portion and is less than the maximum at other locations.

In some embodiments, the fastener is disposed in a recess provided in an outer surface of the sidewall.

In some embodiments, the cover portion includes a rim that extends about a peripheral edge of the cover portion and protrudes toward the base in a direction that is parallel to the axis, and a free edge of the rim is surrounded by the sidewall.

In some embodiments, an outward facing surface of the rim includes an outwardly protruding tab, and the tab abuts the free edge of the sidewall.

In some aspects, a housing is used to house a gear set that is driven by the motor. The housing includes a housing container and a housing cover that closes an open end of the housing container. The housing includes a fastener that secures the housing cover to the housing container. More particularly, the fastener secures the cover to the open end of the container via a mechanical connection between a rim of the cover and a sidewall of the container.

In some embodiments, the fastener is a snap-fit fastener that includes a lug that protrudes outward from an outer surface of the rim of the cover and a clip that is provided on an outer surface of the container sidewall. The clip receives the lug in a snap fit manner, and the lug includes a latching ridge that retains the clip in an engaged configuration with the lug upon snap-fit engagement.

The snap-fit fastener includes features that allow it to securely join the housing components, while also minimizing chances of damage during handling and assembly. For example, the clip portion of the fastener is dimensioned so that the clip portion does not extend axially beyond a free edge of the container sidewall. In addition, the clip and lug are disposed in a recess formed in the sidewall outer surface, whereby the snap-fit fastener is further protected from damage during handling.

BRIEF DESCRIPTION OF THE DRAWINGS

FIG. 6 is a perspective cross sectional view of the gear housing as seen along line 6-6 of FIG. 2.

FIG. 7 is a perspective cross sectional view of a portion of the container of the gear housing.

FIG. 8 is a perspective cross sectional view of a portion of the cover of the gear housing as seen along line 6-6 of FIG. 2.

FIG. 9 is a perspective cross sectional view of a portion of the cover of the gear housing as seen along line 9-9 of FIG. 8.

FIG. 10 is a perspective cross sectional view of a portion of the cover of the gear housing as seen along line 10-10 of FIG. 6.

DETAILED DESCRIPTION

Figure 1:
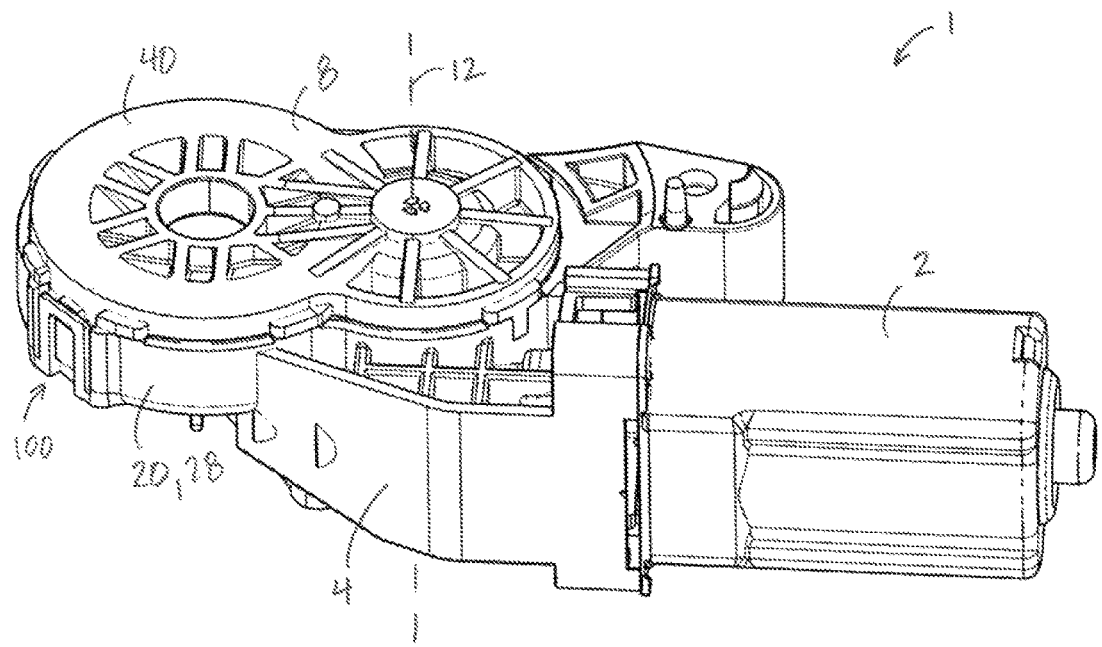
FIG. 1 is a side perspective view of an actuator housing for a seat position actuator, the actuator housing including a gear housing and a drive motor housing.
Figure 2:
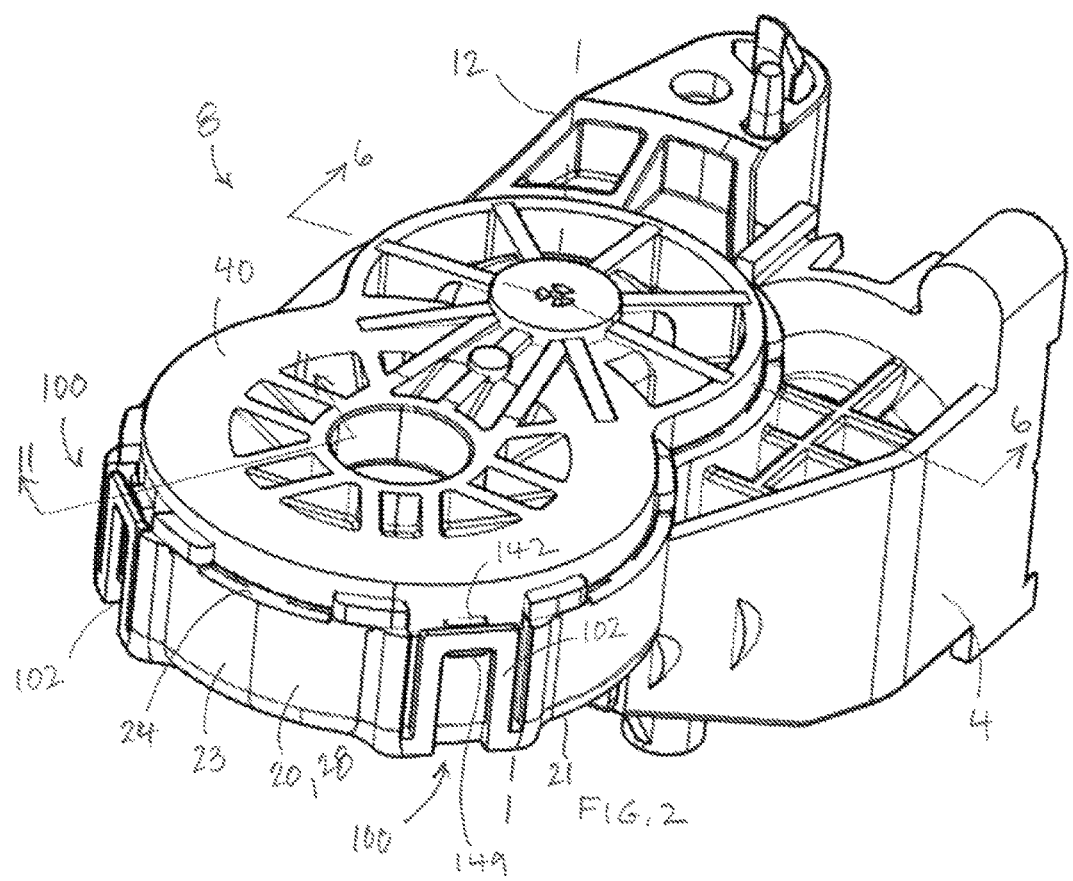
FIG. 2 is a perspective view of the gear housing of FIG. 1.
Figure 3:
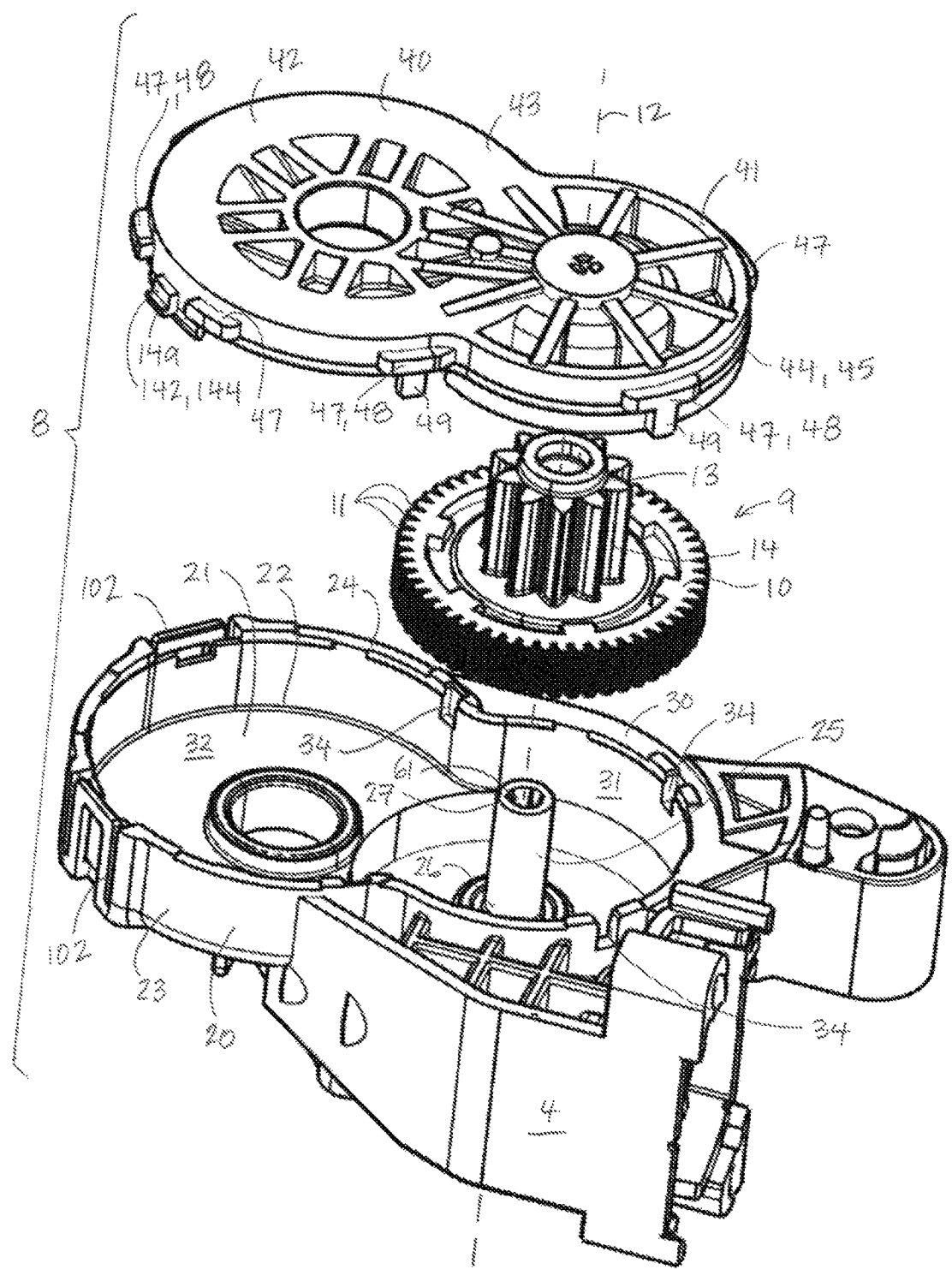
FIG. 3 is an exploded perspective view of the gear housing of FIG. 1 as seen from above and illustrating a portion of a gear set.

Referring to FIGS. 1-4, an actuator such as those used to adjust seat position within a vehicle may include an electric drive motor (not shown), and a gear set 9 (only a portion of the gear set 9 is shown) that is disposed between the drive motor and vehicle seat. The gear set 9 transmits the output of the drive motor to the vehicle seat. The drive motor and the gear set 9 are housed in an actuator housing 1. The actuator housing 1 includes a gear housing 8 that receives the gear set 9 and supports the gear set 9 for rotation. The gear housing 8 has an irregular, curved shape. For example, in the illustrated embodiment, the gear housing 8 has the appearance of a pair of overlapping circles when viewed in top plan view (e.g., in a direction parallel to the rotational axis 12), in which one circle of the pair of circles is smaller than the other circle. The actuator housing 1 also includes a drive shaft housing 4 that receives and supports the output shaft (not shown) of the drive motor. The drive shaft housing 4 may be formed integrally with the gear housing 8 and intersects the gear housing 8 at one side of the smaller circle of the pair of circles. The drive shaft housing 4 is oriented so that the drive shaft of the drive motor will extend in a direction transverse to the rotational axis 12. The drive motor may include a drive motor housing 2 that is formed separately from the actuator housing 1, and is attached thereto during assembly of the actuator. The drive motor housing 2 is joined to the drive shaft housing 4 at a location that is spaced apart from the gear housing 8.

The gear housing 8 is formed of separable components such as a container 20 and a cover 40 that are assembled together after the gear set 9 has been installed therein. The housing components 20, 40 are maintained in the assembled configuration using snap fit mechanical fasteners, including a central snap fit fastener 60 and a pair of peripheral snap fit fasteners 100, as discussed in detail below.

The gear set 9 includes a worm gear 10 that is driven to rotate about a rotational axis 12 by a pinion gear (not shown) provided on the drive motor output shaft. The worm gear 10 is a spur gear having external teeth 11 that are engaged by the pinion gear. The gear set 9 includes a secondary spur gear 14 that is formed integrally with, and protrudes from a side face of, the worm gear 10 so as to rotate about the rotational axis 12 in concert with the worm gear 10. The secondary spur gear 14 has a smaller diameter than the worm gear 10, and mechanically connects the worm gear 10 to other gears (not shown) of the gear set 9. The worm gear 10 and the secondary spur gear 14 have an axial opening 13 that is concentric with the rotational axis 12 of the worm gear 10, and are supported within the gear housing 8 by a gear shaft 25 that extends through the axial opening 13.

The container 20 includes a base 21 that forms the bottom of the container 20 and a sidewall 23 that surrounds a peripheral edge 22 of the base 21 and forms the sides of the container 20. The base peripheral edge 22 has an irregular curved shape having the appearance of a pair of overlapping circles when viewed in top plan view. Thus, the base 21 includes a first circular region 31 corresponding to the smaller circle of the pair of overlapping circles, and a second circular region 32 corresponding to the larger circle of the pair of overlapping circles. The sidewall 23 protrudes from the base peripheral edge 22 in a direction parallel to the rotational axis 12, and includes a free edge 24. The sidewall free edge 24 is spaced apart from, and is parallel to, the base 21, and the distance between the base 21 and the sidewall free edge 24 corresponds to a height h1 of the sidewall 23. The sidewall free edge 24 defines the open end 30 of the container 20, and supports the cover 40, as discussed further below.

The container 20 includes a hollow gear shaft 25 that is formed integrally with the container 20 and protrudes from the base 21 in a direction parallel to the rotational axis 12 and toward the cover 40. The gear shaft 25 is coaxial with the rotational axis 12, and is centered on the smaller, first circular region 31 of the base 21. The gear shaft 25 includes a fixed end 26 that adjoins the base 21 and a free end 27 that is opposed to, and spaced apart from, the fixed end 26. The height h2 of the gear shaft 25 is greater than the height h1 of the sidewall 23, where the term "height" refers to the dimension in a direction parallel to the rotational axis 12 (e.g., the "axial direction"). The gear shaft 25 extends through the gear axial opening 13 and supports the work gear 10 and secondary spur gear 14 for rotation within the gear housing 8.

The cover 40 is configured to close the open end 30 of the container 20, and thus has the appearance of a pair of overlapping circles when viewed in top plan view. In addition, the cover 40 includes a first circular region 41 corresponding to the smaller circle of the pair of overlapping circles, and a second circular region 42 corresponding to the larger circle of the pair of overlapping circles. The overlapping first and second circular regions 41, 42 define a body 43 of the cover 40. The cover body 43 is surrounded by a rim 44 that protrudes from the cover body 43 in an axial direction, e.g. toward the container 20.

The rim 44 has an outward-facing surface 45 and an inward-facing surface 46 that is radially spaced apart from the outward-facing surface 45. Tabs 47 protrude outward from the outward-facing surface 45. When the cover 40 is assembled with the container 20, the cover 40, including the outward-facing surface 45, is partially received within the sidewall 23, and the tabs 47 serve as stops that limit the extent to which the cover 40 can be inserted into the container 20. The tabs 47 include a transverse portion 48 that abut the sidewall free edge 24. A subset of the tabs 47 also include an axial portion 49 that extends in a direction perpendicular to the transverse portion 48 and intersects the transverse portion 48 so that the tab 47 has a "T" shape when the cover is viewed in a direction transverse to the rotational axis 12. The tab axial portion 49 is received within a corresponding slot 34 provided in the sidewall free edge 24.

Figure 4:
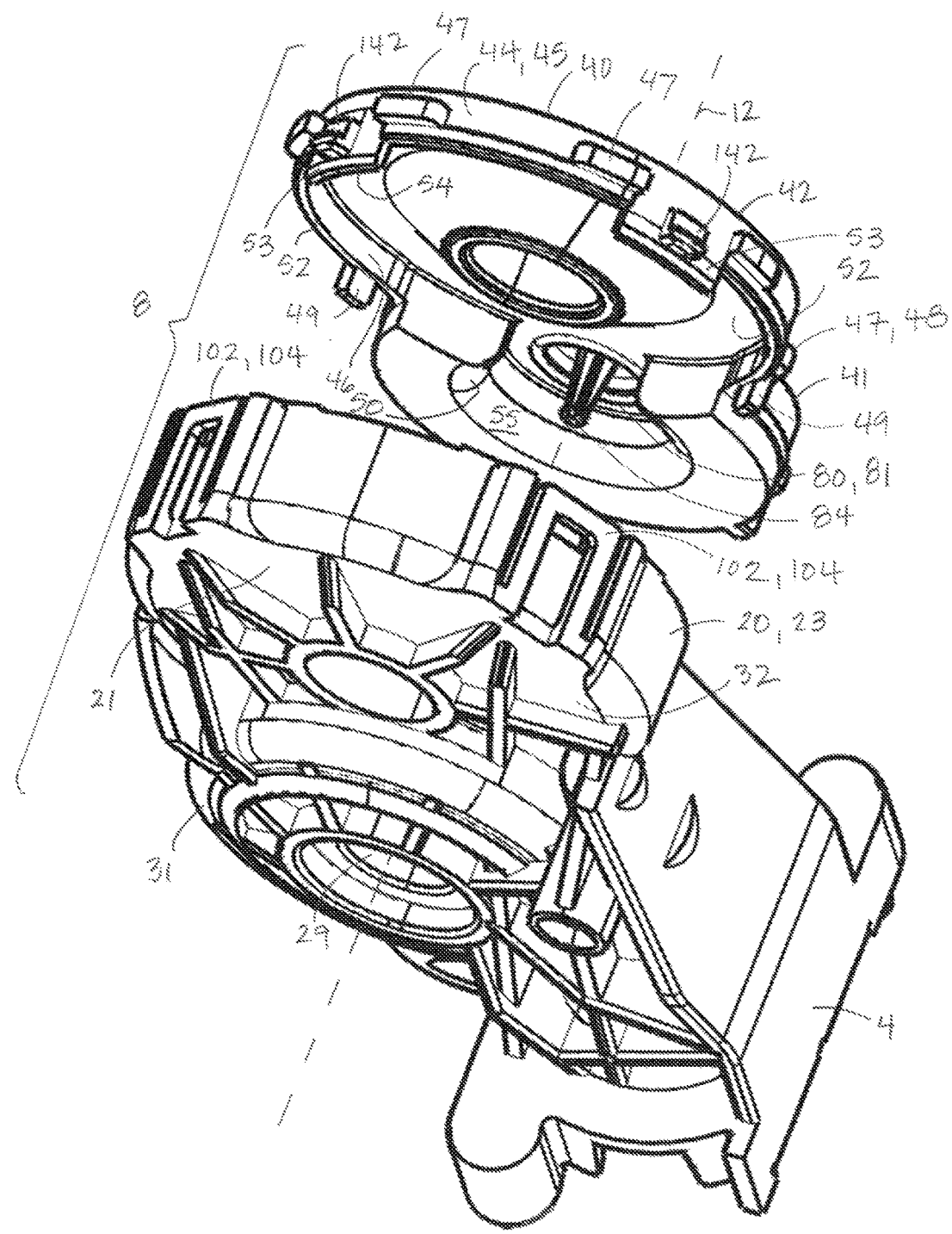
FIG. 4 is an exploded perspective view of the gear housing of FIG. 1 as seen from below with the portion of the gear set omitted for clarity.

Within the cover first circular region 41, the cover 40 includes an inner wall 50 that is parallel to the rim 44 and disposed between the rotational axis 12 and the rim 44 (FIG. 4). The inner wall 50 defines a cylindrical vacancy 55 in the cover 40 that is centered on the rotational axis 12. The inner wall 50 has a diameter that is sufficient to receive the gear shaft free end 27 and the secondary spur gear 14 in a clearance fit.

Within the cover second circular region 42, the rim 44 includes a pair of circumferentially-spaced extension tabs 53 that protrude from a free edge 52 of the rim 44 in a direction parallel to the rotational axis 12. The extension tabs 53 are portions of the rim 44 that extend axially beyond the rim free edge 52, and each extension tab 53 supports a portion of a peripheral snap fit fastener 100, as discussed further below.

When the cover 40 is assembled with the container 20, the first circular region 41 of the cover 40 is aligned with the first circular region 31 of the container 20, and the second circular region 42 of the cover 40 is aligned with the second circular region 32 of the container 20. In addition, the tab transverse portions 48 abut the sidewall free edge 24, and the tab axial portions 49 are disposed in the slots 34. The cover 40 is securely and reliably retained in this assembled configuration with the container 20 via the mechanical connection provided by the central snap fit fastener 60 and the peripheral snap fit fasteners 100.

Figure 5:
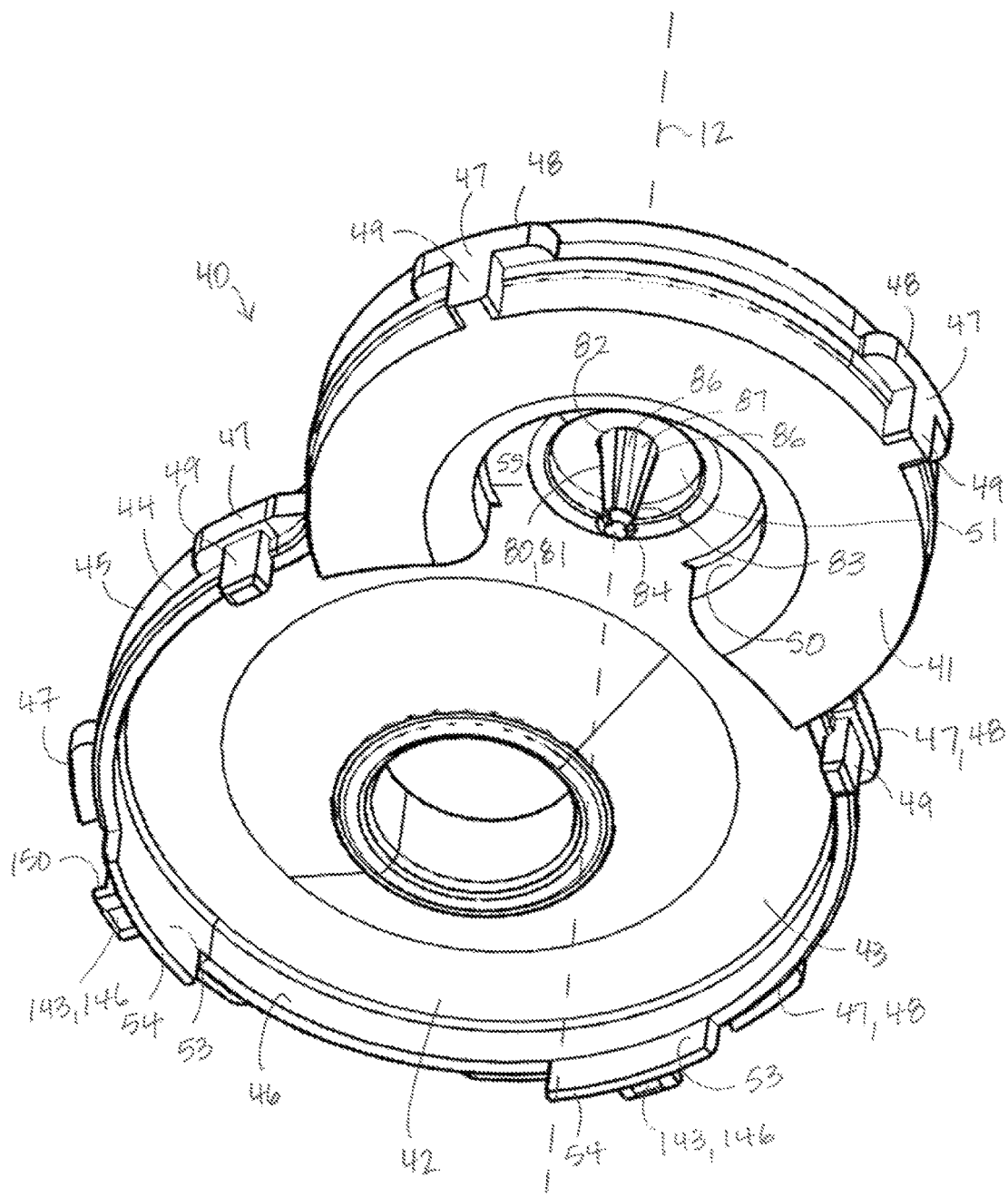
FIG. 5 is a perspective view of an inward facing surface of the cover of the gear housing.
Figure 11:
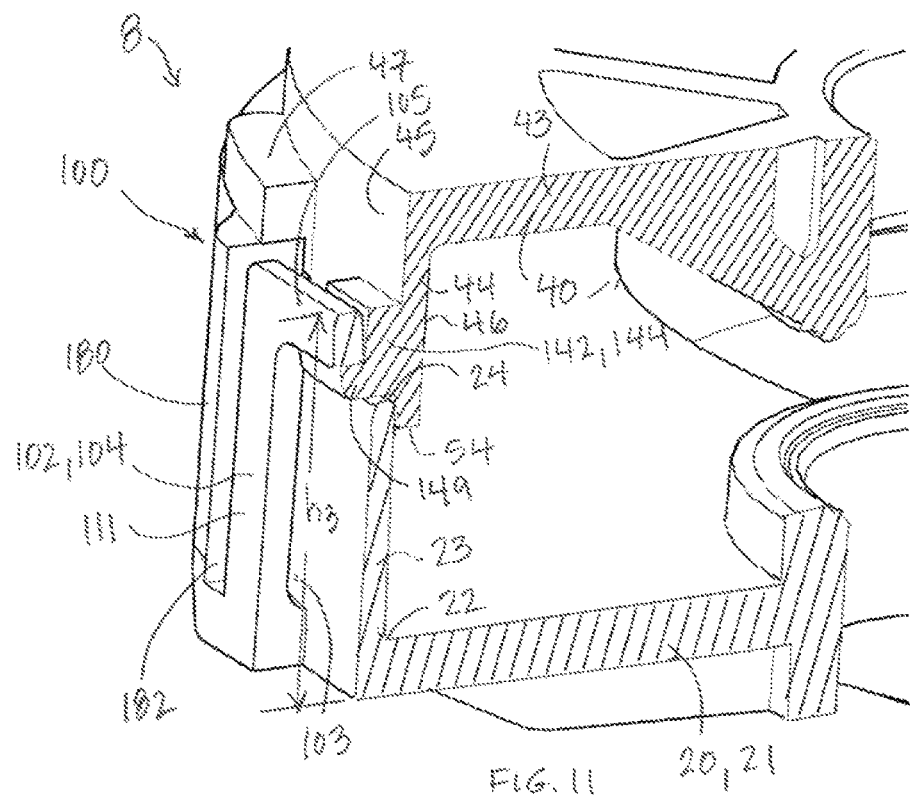
FIG. 11 is a perspective cross sectional view of a portion of the gear housing as seen along line 11-11 of FIG. 2.
Figure 12:
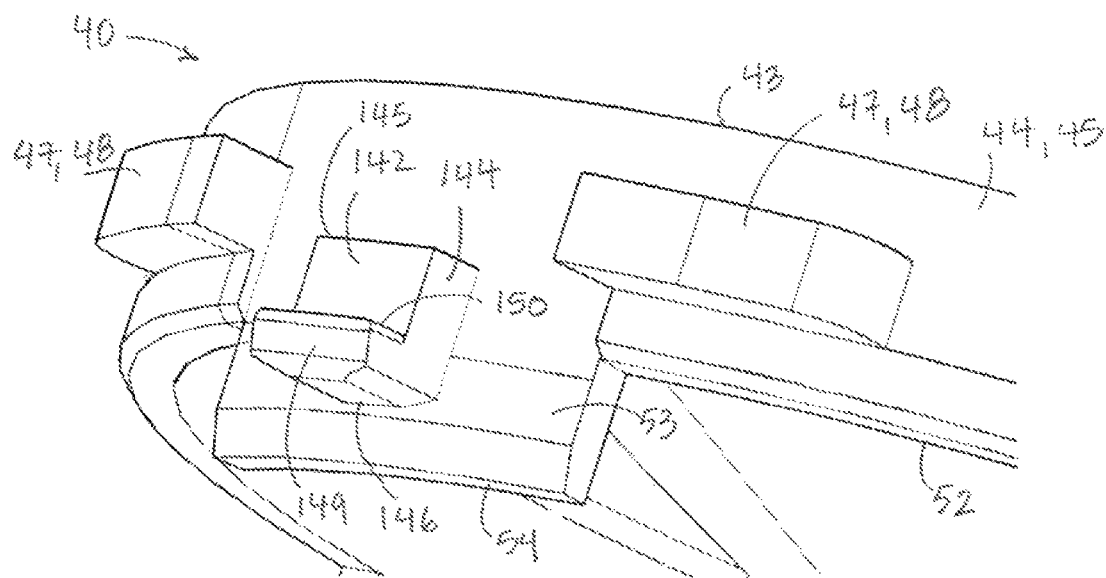
FIG. 12 is a side perspective view of a portion of the cover of the gear housing as seen from outside the gear housing.
Figure 13:
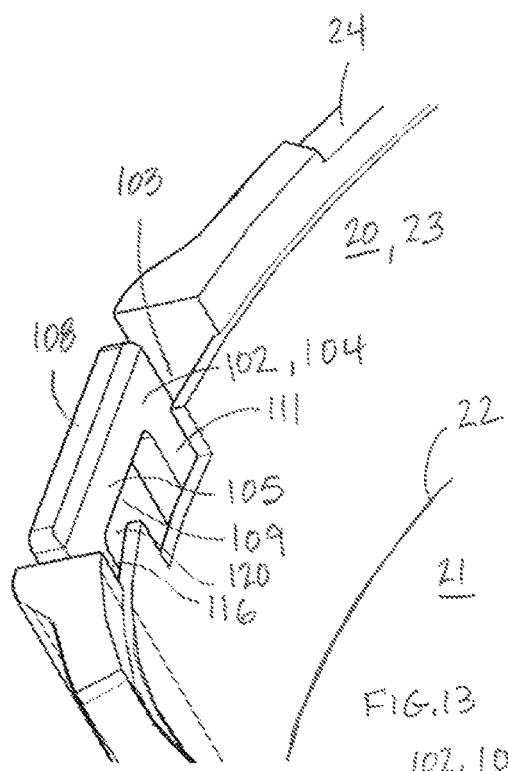
FIG. 13 is a side perspective view of a portion of the container of the gear housing as seen from inside the gear housing.
Figure 14:
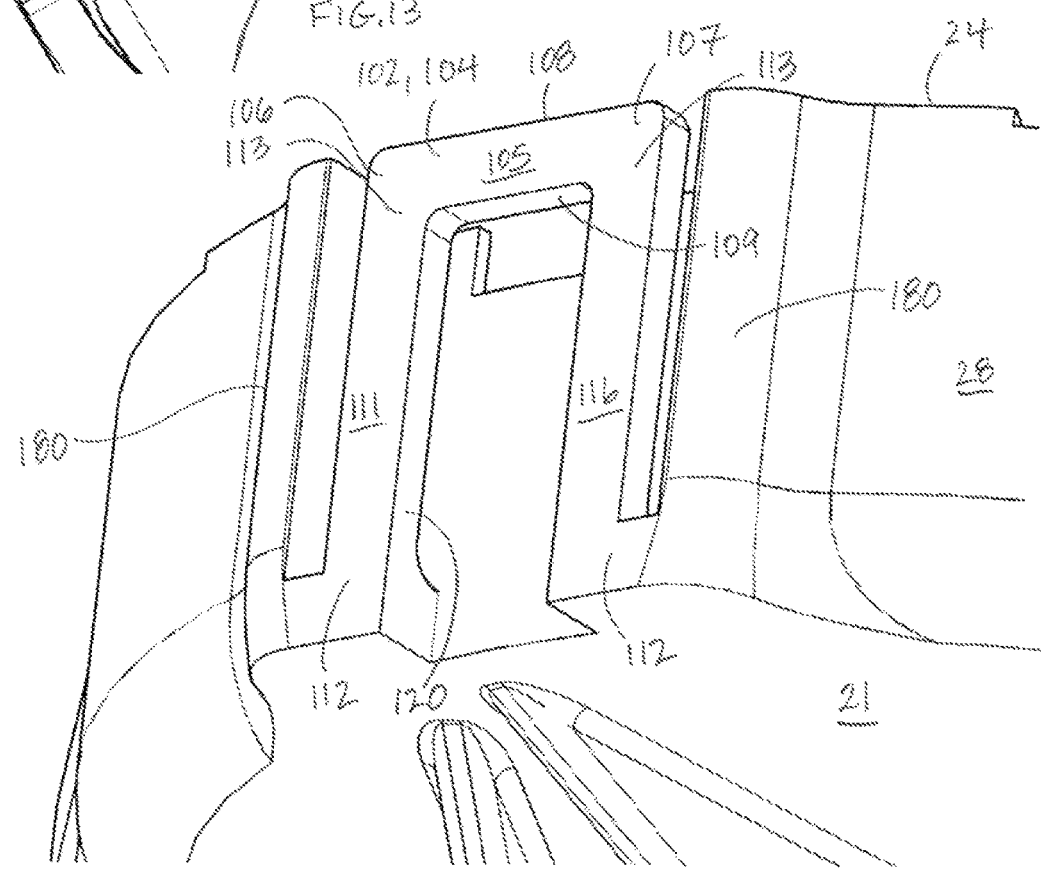
FIG. 14 is a side perspective view of a portion of the container of the gear housing as seen from outside the gear housing.

Referring to FIGS. 5-7, the central snap-fit fastener 60 secures the cover 40 to the container 20 at a location that is spaced apart from the sidewall 23 and coincides with the axis of rotation 12 of the worm gear 10. The central snap-fit fastener 60 includes a receptacle 61 that is disposed in the hollow interior space of the gear shaft 25, and a retainer 80 that protrudes from the cover body inner surface 51 and forms a snap-fit engagement with the receptacle 61.

The receptacle 61 is disposed within the hollow interior of the gear shaft 25. In particular, the receptacle is formed integrally with an inner surface 29 of the gear shaft 25, and has the shape of a truncated hollow cone that is centered on the rotational axis 12. The receptacle 61 includes a receptacle first end 62 that is fixed to an inner surface of the gear shaft 25 at a location that coincides with the gear shaft free end 27. The receptacle 61 also includes a receptacle second end 63 that is disposed between the gear shaft fixed and free ends 26, 27. The receptacle second end 63 is spaced apart from, and surrounded by, the gear shaft inner surface 29. Since the receptacle 61 is disposed within the recess 35 provided by the hollow interior of the gear shaft 25, the gear shaft 25 serves to protect the receptacle 61 during handling and assembly of the actuator housing 1.

In addition, an inner diameter of the receptacle 61 is greatest at the receptacle first end 62 (e.g., at the free, open end 27 of the gear shaft), and least at the receptacle second end 63. The receptacle 61 includes slots 64 that extend between the receptacle first end 62 and the receptacle second end 63. The slots 64 separate the receptacle 61 into elastic fingers 65. In the illustrated embodiment, the receptacle 62 has three equidistantly spaced slots 64 and three fingers 65, but the receptacle may have a fewer or greater number of slots 64 as required by the specific application. Moreover, the spacing of the slots 64 may also be non-uniform as required by specific application.

Referring also to FIGS. 8-10, the retainer 80 includes a post 81 that protrudes from an inner surface 51 of the cover body 43. In particular, the post 81 has a fixed end 82 that is integral with the inner surface 51 within first circular region 41 so as to be coaxial with the rotational axis 12, and so as to be surrounded by, and spaced apart from, the cover inner wall 50. Thus, the retainer 80 is disposed in a recess 55 defined by the cover inner wall 50, and, among other things, the cover inner wall 50 serves to protect the post 81 during handling and assembly of the actuator housing 1.

In addition, the post 81 includes a free end 83 that is opposed to the fixed end 82, and a latch portion 84 that is disposed on the post free end 83. The post fixed end 82 has a larger diameter than a diameter of the post free end 83, whereby the post 81 is tapered in the axial direction. The latch portion 84 has a diameter that is larger than the diameter of the post free end 83 and the inner diameter of the receptacle second end 63. In addition, the latch portion 84 has a diameter that is smaller than the diameter of the post fixed end 82. Due to the difference in diameters, a shoulder 85 is formed at the transition between the post free end 83 and the latch portion 84. The shoulder 85 faces, and is parallel to, the cover body inner surface 51. The post 81 also includes axial grooves 86 that extend between the post fixed end 82 and the latch portion 84, and lands 87 are defined between the grooves 86.

During assembly of the cover 40 with the container 20, the post 81 is inserted into the gear shaft free end 27 and thus also the receptacle first end 62. Since the latch portion 84 has a diameter that is larger than that of the receptacle second end 63, as the post 81 advances axially within the receptacle 61, the latch portion 84 urges the receptacle fingers 65 to deflect radially away from the rotational axis 12, whereby the receptacle second end 63 radially expands. When the cover 40 is fully assembled with the container 20 such that the tab transverse portions 48 abut the sidewall free edge 24, the post 81 is disposed in the receptacle 61 and extends through the receptacle second end 63 so that the latch portion 84 is disposed outside the receptacle 61. In this position, the receptacle fingers 65 elastically return to less expanded configuration closer to the rotational axis 12, and reside within a corresponding groove 86 of the post 81, while the slots 64 receive a corresponding land of the post 81. The retainer 80 is retained in connection with the receptacle 61 via engagement of the latch portion shoulder 85 with the receptacle second end 63, which prevents withdrawal of the post 81 from the receptacle 61.

Referring to FIGS. 2-4 and 11-14, the peripheral snap fit fasteners 100 secure the rim 44 of the cover 40 to the sidewall 23 of the container 20. In the illustrated embodiment, the actuator housing 1 includes two peripheral snap-fit fasteners 100 that are provided within the second circular region 32. The snap-fit fasteners 100 are spaced apart from each other and from first circular region 31 along a circumference of the sidewall 23. Each peripheral snap-fit fastener 100 includes a clip 102 that is disposed on an outer surface 28 of the sidewall 23, a lug 142 that protrudes from the cover 40 and engages the clip 102 and bumpers 180 that define a recess 182 within the container sidewall 23 that receives the clip 102 and lug 142 therein.

The clip 102 includes a U-shaped plate portion 104 that extends in parallel to the sidewall 23 such that a narrow insertion space 103 is provided between the plate portion 104 and the sidewall 23. The plate portion 104 includes a latch bar 105 and first and second legs 111, 116 that together provide the clip 102 with its U-shape.

The first and second legs 111, 116 each include a proximal end 112 that is formed integrally with the sidewall outer surface 28 at a location corresponding the container base 21. The first and second legs 111, 116 each include a distal end 113 that is opposed to the proximal end 112 and is axially spaced apart from the proximal end 112. In addition, the distal end 113 of each of the first and second legs 111, 116 is spaced apart from the sidewall outer surface a distance corresponding to the depth of the insertion space 103. The first and second legs 111, 116 extend axially and support the latch bar 105 in space.

The latch bar 105 extends in a direction that is perpendicular to the first and second legs 111, 116. The latch bar 105 has a first end 106 that is connected to the distal end 113 of the first leg 111. The latch bar 105 has a second end 107 that is opposed to the first end 106, and is connected to the distal end 113 of the second leg 116. In addition, the latch bar 105 includes an outer edge 108 that extends between the latch bar first end 106 and the latch bar second end 107 in a direction perpendicular to the rotational axis 12 and that faces the cover 40, and an inner edge 109 that is parallel to the outer edge 108 and faces the container base 21. The plate portion 104 is dimensioned so that the latch bar outer edge 108 is disposed no further from the base 21 than the sidewall free edge 24. That is, the height h3 of the plate portion 104 is less than or equal to the height h1 of the sidewall 23.

The clip 102 includes a clip opening 120 that corresponds to the space bounded by the latch bar 105, the first leg 111 and the second leg 116.

The lug 142 includes a generally rectangular lug plate 144 that protrudes from the rim outward-facing surface 45 in a direction perpendicular to the rotational axis 12. In particular, the lug plate 144 is disposed on a rim extension tab 53. The lug plate 144 includes a first end 145 that is parallel to the rim free edge 52, a second end 146 opposed to the lug plate first end 145. The lug plate 144 is positioned on the rim 44 such that the lug plate first end 145 is axially positioned between the rim free edge 52 and the cover body 43 at a location close to the rim free edge 52. The lug plate second end 146 is disposed further from the cover body 43 than the lug plate first end 145. In particular, the lug plate second end 146 is disposed between the rim free edge 52 and a free edge 54 of the extension tab 53.

The lug 142 includes a ridge 149 that protrudes outward and extends along the lug plate second end 146. Thus, the ridge 149 is disposed further from the cover body 43 than the rim free edge 52. The ridge 149 provides a latch bar engagement edge 150 that is parallel to the rim free edge 54 and faces opposite to the rim free edge 54.

The peripheral snap-fit fastener 100 includes a bumper 180 disposed on each of opposed sides of the plate portion 104, whereby the plate portion 104 is disposed between a pair of bumpers 180 along a circumferential direction of the sidewall 23. Each bumper 180 protrudes outward from the sidewall outer surface 28 at least distance that corresponds to a distance of an outer surface 110 of the plate portion 104 from the sidewall outer surface 28. Each bumper 180 has an axial dimension that corresponds to an axial dimension of the plate portion 104. In addition, each bumper 180 is inclined along a circumferential direction of the sidewall 23 such that the distance that the bumper 180 protrudes outward from the sidewall outer surface 28 is a maximum adjacent to the plate portion 104 and less than the maximum at locations that are spaced apart from the plate portion 104. Since the bumpers 180 protrude outward from the sidewall 23, the clip 102 and lug 142 are disposed in the recess 182 defined between the pair of bumpers 180. The recess 182 serves to protect the clip 102 during handling and assembly, and to protect the peripheral snap-fit fastener 100 as a whole once the actuator housing 1 is assembled.

When the clip 104 is assembled with the lug 142, a portion of the cover extension tab 53 extends into the container 20 and overlies an inner surface of the sidewall 33. In addition, the lug plate 144 extends into the insertion space 103 between the plate portion 104 and the sidewall outer surface 28, and the ridge 149 protrudes into the clip opening 120. In this configuration, the latch bar engagement edge 150 abuts the latch bar inner edge 109, whereby the cover 40 is retained on the container 20. As the cover extension tab 53 and lug 142 is inserted into the insertion space 103, the plate portion 104 deforms and the latch bar 105 is displaced outward to accommodate the passage of the lug plate 144 and ridge 149 between the latch bar 105 and the sidewall outer surface 28. When the ridge 149 has passed the latch bar and resides within the clip opening 120, the plate portion 104 elastically returns to its undisplaced configuration.

In the illustrated embodiment, the receptacle 61 of the central snap-fit fastener 60 is disposed in the hollow interior space of the gear shaft 25, and the retainer 80 of the central snap-fit fastener 60 protrudes from the cover inner surface 51. It is understood that in other embodiments, the retainer 80 may be disposed in the hollow interior space of the gear shaft 25, and the receptacle 61 may protrude from the cover inner surface 51.

Selective illustrative embodiments of the housing and fasteners are described above in some detail. It should be understood that only structures considered necessary for clarifying the the housing and fasteners have been described herein. Other conventional structures, and those of ancillary and auxiliary components of the housing and fasteners, are assumed to be known and understood by those skilled in the art. Moreover, while a working example of the housing and fasteners have been described above, the housing and fasteners are not limited to the working examples described above, but various design alterations may be carried out without departing from the housing and fasteners as set forth in the claims.

We claim:

1. A fastener configured to connect a housing cover to an open end of a housing container, the housing container including a base, an axis that extends in a direction perpendicular to the base, and a sidewall that extends about a peripheral edge of the base and protrudes from the base in a direction that is parallel to the axis, wherein the fastener comprises a clip that is disposed on an outer surface of the sidewall and a lug that protrudes from the cover and engages the clip,
    the clip including a U-shaped plate portion that extends in parallel to the sidewall such that an insertion space is provided between the plate portion and the sidewall, the plate portion including:
        a latch bar that has a first end, a second end that is opposed to the first end, an outer edge that extends between the first end and the second end in a direction perpendicular to the axis and an inner edge that is parallel to the outer edge;
        an axially extending first leg, a proximal end of the first leg being joined to the outer surface of the sidewall and a distal end of the first leg being spaced apart from the outer surface of the sidewall and joined to the first end of the latch bar; and
        an axially extending second leg, a proximal end of the second leg being joined to the outer surface of the sidewall and a distal end of the second leg being spaced apart from the outer surface of the sidewall and joined to the second end of the latch bar, the latch bar, the first leg and the second leg defining a clip opening,
    the lug including a lug plate that protrudes from an outer surface of the cover in a direction perpendicular to the axis, the lug including a ridge that protrudes along one end of the lug plate in a direction perpendicular to the axis, the ridge providing a latch bar engagement edge,
    wherein when the clip is assembled with the lug, the lug plate extends into the insertion space, the ridge protrudes into the clip opening and the latch bar engagement edge abuts the inner edge of the latch bar, and
    the plate portion is dimensioned so that the latch bar outer edge is disposed no further from the base than a free edge of the sidewall.

2. The fastener of claim 1, wherein the clip is sufficiently elastic to be displaced relative to the sidewall in a direction perpendicular to the axis upon application of a perpendicular force to the clip, and to return to an undisplaced configuration upon removal of the perpendicular force.

3. The fastener of claim 1, wherein the housing cover includes a cover portion and a rim that extends about a peripheral edge of the cover portion and protrudes toward the base in a direction that is parallel to the axis, and the rim includes an extension tab that protrudes from a free edge of the rim in a direction parallel to the axis, and the lug is disposed on the extension tab.

4. The fastener of claim 3, wherein the lug is arranged on the extension tab such that the ridge is further from the cover portion than the rim free edge.

5. The fastener of claim 3, wherein a portion of the extension tab extends into the housing container and overlies an inner surface of the sidewall.

6. The fastener of claim 1, comprising a pair of bumpers that protrude from the sidewall outer surface such that a bumper is disposed on each of opposed sides of the plate portion, wherein each bumper protrudes outward from the sidewall, and a distance that each bumper protrudes from the sidewall is at least a distance of an outer surface of the plate portion from the sidewall.

7. The fastener of claim 6, wherein each bumper has an axial dimension that is at least as long as an axial dimension of the plate portion.

8. The fastener of claim 6, wherein each bumper protrudes irregularly along a surface of the sidewall in a direction parallel to the base such that the distance that each bumper protrudes outward from the sidewall is at a maximum at locations of each bumper nearest to the plate portion and is less than the maximum at other locations.

9. The fastener of claim 1, wherein the fastener is disposed in a recess provided in the outer surface of the sidewall.

10. A housing comprising: a housing container; a housing cover configured to close an open end of the housing container; and a mechanical fastener that secures the housing cover to the housing container open end,
    the housing container including a base, an axis that extends in a direction perpendicular to the base, and a sidewall that extends about a peripheral edge of the base and protrudes from the base in a direction that is parallel to the axis, the fastener including a clip that is disposed on an outer surface of the sidewall and a lug that protrudes from the cover and engages the clip, the clip including a U-shaped plate portion that extends in parallel to the sidewall such that an insertion space is provided between the plate portion and the sidewall, the plate portion including:

a latch bar that has a first end, a second end that is opposed to the first end, an outer edge that extends between the first end and the second end in a direction perpendicular to the axis and an inner edge that is parallel to the outer edge;

an axially extending first leg, a proximal end of the first leg being joined to the outer surface of the sidewall and a distal end of the first leg being spaced apart from the outer surface of the sidewall and joined to the first end of the latch bar; and an axially extending second leg, a proximal end of the second leg being joined to the outer surface of the sidewall and a distal end of the second leg being spaced apart from the outer surface of the sidewall and joined to the second end of the latch bar, the latch bar, the first leg and the second leg defining a clip opening, the lug including a lug plate that protrudes from an outer surface of the cover in a direction perpendicular to the axis, the lug including a ridge that protrudes along one end of the lug plate in a direction perpendicular to the axis, the ridge providing a latch bar engagement edge, wherein when the clip is assembled with the lug, the lug plate extends into the insertion space, the ridge protrudes into the clip opening and the latch bar engagement edge abuts the inner edge of the latch bar, and the plate portion is dimensioned so that the latch bar outer edge is disposed no further from the base than a free edge of the sidewall.

11. The housing of claim 10, wherein the clip is sufficiently elastic to be displaced relative to the sidewall in a direction perpendicular to the axis upon application of a perpendicular force to the clip, and to return to an undisplaced configuration upon removal of the perpendicular force.

12. The housing of claim 10, wherein the housing cover includes a cover portion and a rim that extends about a peripheral edge of the cover portion and protrudes toward the base in a direction that is parallel to the axis, and the rim includes an extension tab that protrudes from a free edge of the rim in a direction parallel to the axis, and the lug is disposed on the extension tab.

13. The housing of claim 12, wherein the lug is arranged on the extension tab such that the ridge is further from the cover portion than the rim free edge.

14. The housing of claim 12, wherein a portion of the extension tab extends into the housing container and overlies an inner surface of the sidewall.

15. The housing of claim 10, comprising a pair of bumpers that protrude from the sidewall outer surface such that a bumper is disposed on each of opposed sides of the plate portion, wherein each bumper protrudes outward from the sidewall, and a distance that each bumper protrudes from the sidewall is at least a distance of an outer surface of the plate portion from the sidewall.

16. The housing of claim 15, wherein each bumper has an axial dimension that is at least as long as an axial dimension of the plate portion.

17. The housing of claim 15, wherein each bumper protrudes irregularly along a surface of the sidewall in a direction parallel to the base such that the distance that each bumper protrudes outward from the sidewall is at a maximum at locations of each bumper nearest to the plate portion and is less than the maximum at other locations.

18. The housing of claim 10, wherein the fastener is disposed in a recess provided in the outer surface of the sidewall.

19. The housing of claim 10, wherein the cover portion includes a rim that extends about a peripheral edge of the cover portion and protrudes toward the base in a direction that is parallel to the axis, and a free edge of the rim is surrounded by the sidewall.

20. The housing of claim 19, wherein an outward facing surface of the rim includes an outwardly protruding tab, and the tab abuts the free edge of the sidewall.

* * * * *